United States Patent
Zheng et al.

(10) Patent No.: US 11,345,223 B2
(45) Date of Patent: May 31, 2022

(54) HINGE ASSEMBLY AND TONNEAU COVER

(71) Applicant: Strictly Auto Parts Inc., Markham (CA)

(72) Inventors: Lance Zheng, Markham (CA); Von Hao, Thornhill (CA)

(73) Assignee: Strictly Auto Parts Inc., Markham (CA)

( * ) Notice: Subject to any disclaimer, the term of this patent is extended or adjusted under 35 U.S.C. 154(b) by 0 days.

(21) Appl. No.: 16/859,692

(22) Filed: Apr. 27, 2020

(65) Prior Publication Data

US 2021/0331566 A1    Oct. 28, 2021

(51) Int. Cl.
| | |
|---|---|
| *B60P 7/14* | (2006.01) |
| *B60P 7/16* | (2006.01) |
| *B60J 7/14* | (2006.01) |
| *B60P 7/02* | (2006.01) |
| *B60J 7/16* | (2006.01) |

(52) U.S. Cl.
CPC ............. *B60J 7/141* (2013.01); *B60J 7/1607* (2013.01); *B60P 7/02* (2013.01)

(58) Field of Classification Search
CPC ... B60J 7/14; B60J 7/141; B60J 7/1607; B60J 7/1621; B62D 33/04
USPC .......................... 296/100.01, 100.06, 100.09
See application file for complete search history.

(56) References Cited

U.S. PATENT DOCUMENTS

| | | | |
|---|---|---|---|
| 9,039,066 B1 | 5/2015 | Yue | |
| 10,414,257 B2 * | 9/2019 | Facchinello | ............. B60J 7/141 |
| 10,471,814 B1 * | 11/2019 | Weng | ........................ B60J 7/141 |
| 10,525,803 B2 * | 1/2020 | Hutchens, III | ......... B32B 5/245 |
| 2008/0100088 A1 * | 5/2008 | Calder | ..................... B60J 7/141 |
| | | | 296/100.09 |
| 2015/0165960 A1 * | 6/2015 | Yue | ......................... B60J 7/141 |
| | | | 296/100.09 |
| 2016/0200375 A1 * | 7/2016 | Kerr, III | ................... B60J 7/141 |
| | | | 296/100.07 |

\* cited by examiner

*Primary Examiner* — Jason S Daniels
(74) *Attorney, Agent, or Firm* — Eric J. Sosenko; Jonathan P. O'Brien; Honigman LLP

(57) ABSTRACT

A hinge assembly for a tonneau cover. The hinge assembly allows panels of the tonneau cover to be folded on top of one another and includes a pivot frame having an engagement side and a pivot side. The engagement side of the pivot frame is configured to engage one end of a panel of the tonneau cover and pivot side of the pivot frame includes at least one recess defined therein. The hinge assembly also includes a pivot component having a pivot with at least one recess defined therein. A hinge member, having first and second ends, is pivotally engaged with the pivot frame and the pivot component in the respective recesses thereof through the first and second ends.

20 Claims, 9 Drawing Sheets

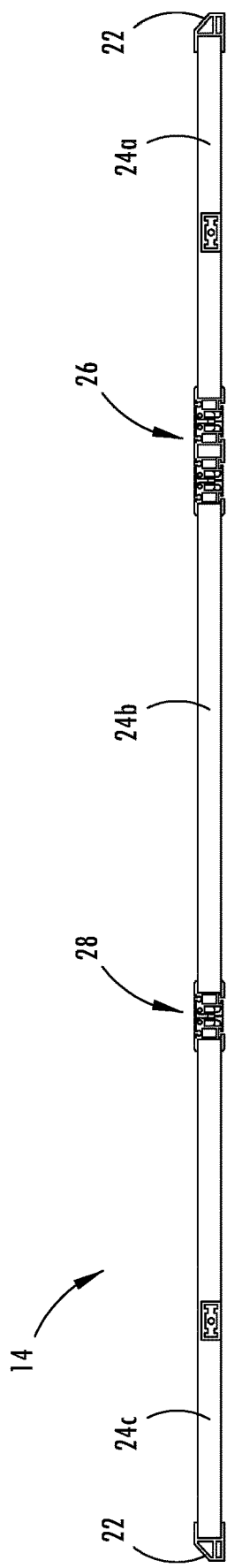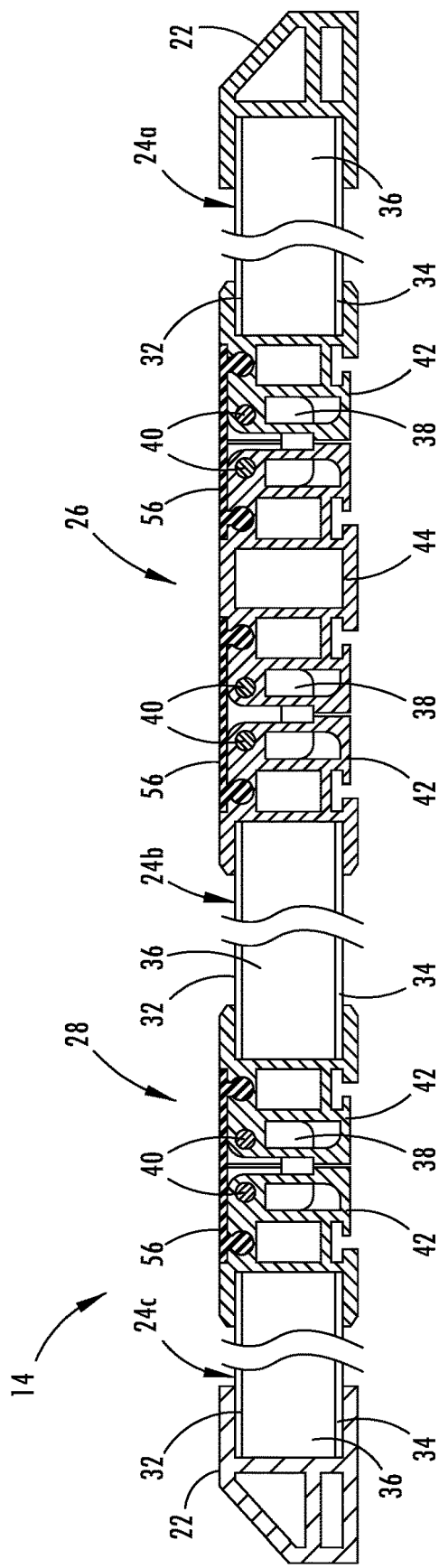
FIG. 2A
FIG. 2B

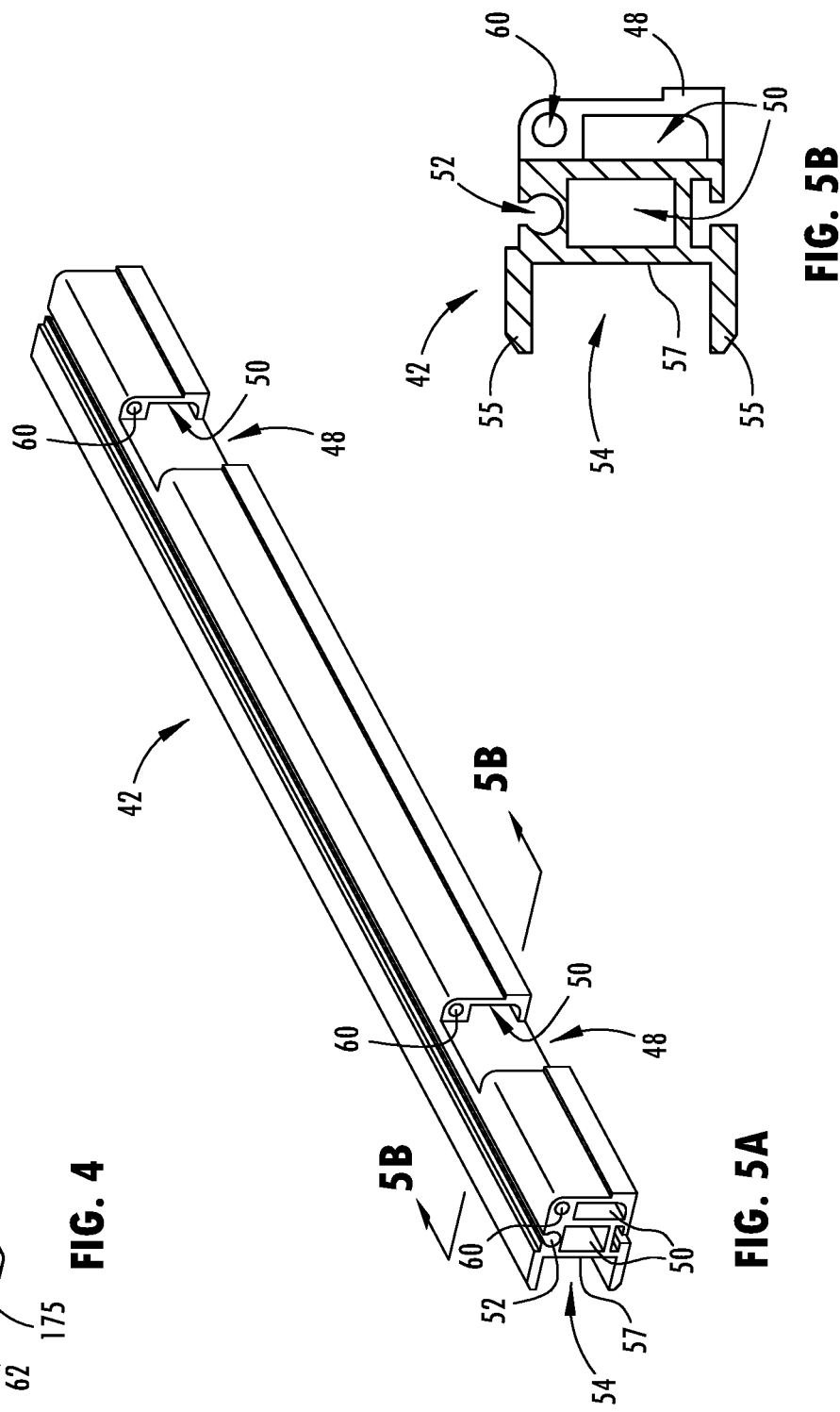

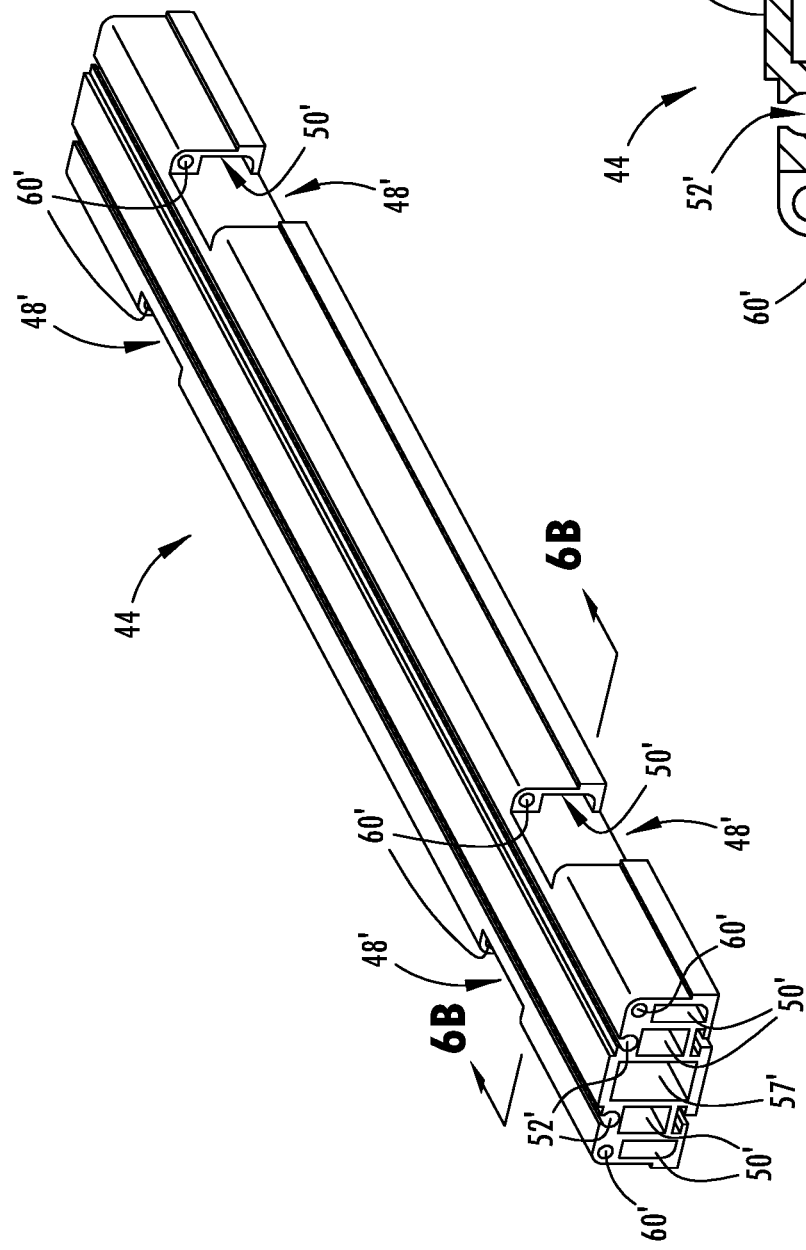
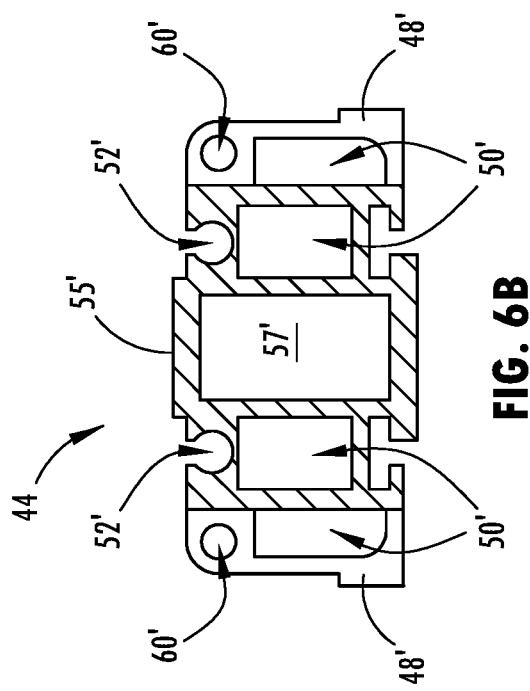
FIG. 6A
FIG. 6B

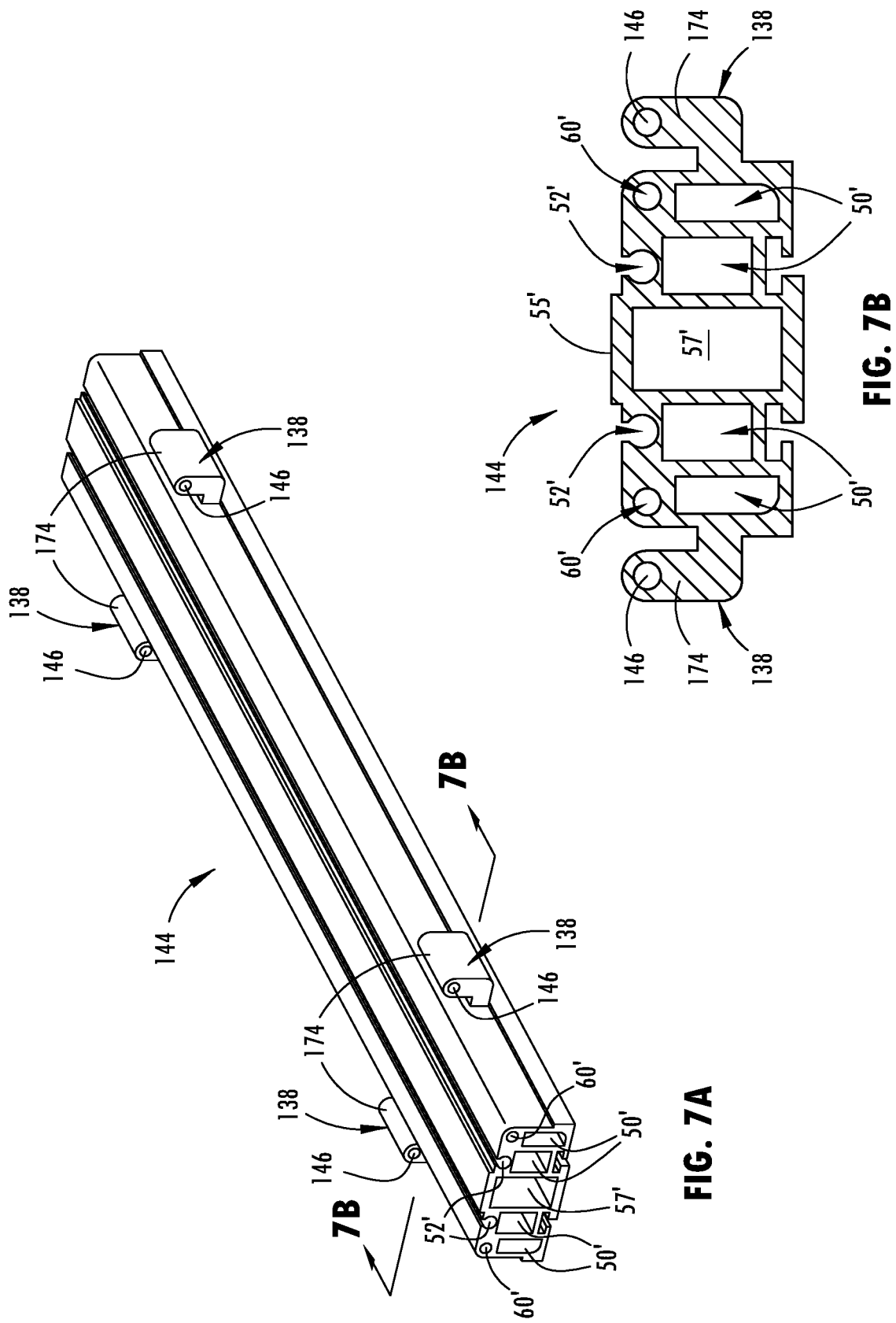

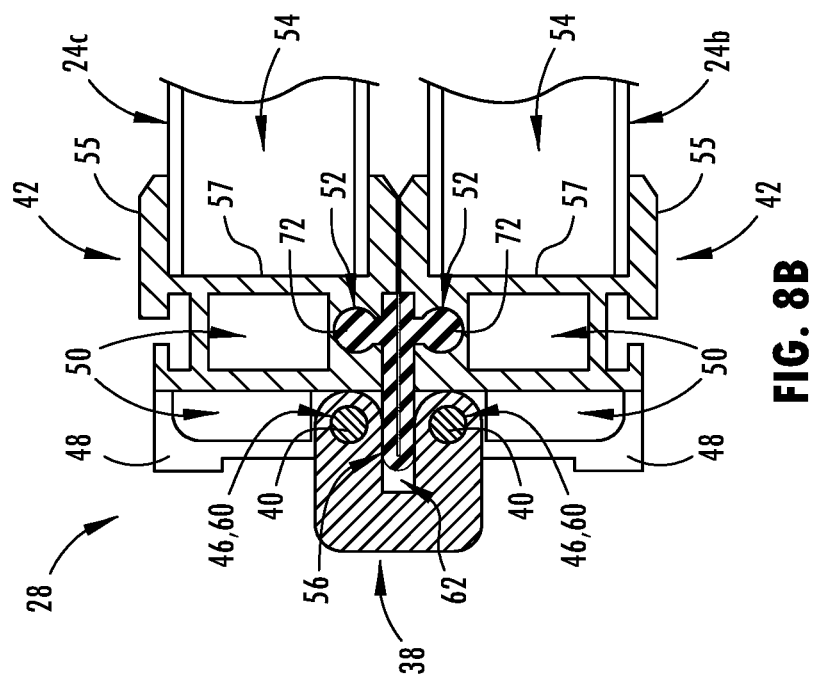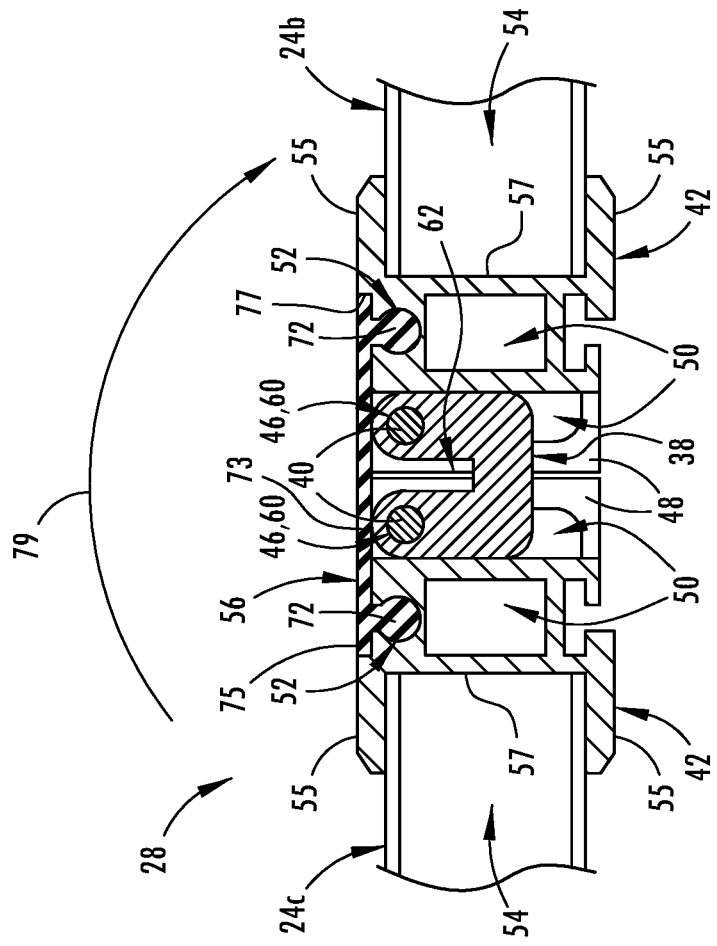

HINGE ASSEMBLY AND TONNEAU COVER

BACKGROUND

Field of the Invention

The present invention generally relates to coverings intended to be installed to cover the cargo boxes of pickup trucks. More specifically, the present invention relates to a hinge assembly intended for use within a foldable tonneau cover system.

Description of Related Art

Tonneau covers are used to cover the cargo box of a pickup truck and protect cargo box and any contents therein against rain, snow, dirt and debris, as well as from view of persons passing by. The more popular tonneau cover systems of today can be classified as either soft-top or hard-top varieties and have various mechanisms for opening and closing. Soft-top tonneau cover are typically rolled or folded to allow user access to the cargo box. Hard-top tonneau covers are typically lifted or folded to allow user access to the cargo box. Folding hard top tonneau covers require the use strong hinge assemblies that can support the weight of the panels and easily allow a user to move the panels so as to fold and unfold the tonneau cover.

SUMMARY

Accordingly, in one aspect, the present invention provides a hinge for a foldable tonneau cover.

In another aspect of the invention, a foldable tonneau cover is provided having a plurality of panels, including at least a first panel and a second panel, and a hinge assembly pivotally connecting the first panel to the second panel. The hinge assembly includes first and second pivot frames and a hinge member. The pivot frames each have a top side, a bottom side, an engagement side and a pivot side opposite of the engagement side. The engagement side of the pivot frames are respectively engaged with one end of the first and second panels. Defined in the pivot side of each of the pivot frame is at least one recess. The hinge member has a first and second ends that are respectively positioned in the recesses and pivotally engaged with the first and second pivot frames.

In a further aspect, bores are formed through the first and the second ends of the hinge member.

In an additional aspect, the bores extending into the first and second pivot frames from the recesses.

In yet another aspect, a first pivot pin extends through the bore of the first end of the hinge member and into the bore defined in the first pivot frame, and a second pivot pin extends through the bore of the second end of the hinge member and into the bore defined in the second pivot frame, thereby pivotally connecting the first pivot frame to the second pivot frame.

In a further aspect, the hinge member has a U-shaped cross section and has the first end defined by a first leg of the U-shapes cross section and has the second end defined by a second leg of the U-shaped cross section, the first and second legs being connected by a bight of the U-shaped cross section.

In still an additional aspect, a seal is provided and engaged with first and second pivot frames so as to extend over the hinge member.

In another aspect of the invention, a hinge assembly for a tonneau cover is provided to allow panels of the tonneau cover to be folded on top of one another. The hinge assembly includes a pivot frame, a pivot component and a hinge member. The pivot frame further includes a top side, a bottom side, an engagement side and a pivot side opposite of the engagement side. The engagement side of the pivot frame is configured to engage with one end of a panel of the tonneau cover. At least one recess is also defined in the pivot side of the pivot frame. The pivot component includes a top side, a bottom side and a pivot side extending between the top and bottom sides. At least one recess is defined in the pivot side of the second component. The hinge member includes a first end and a second end, with the first end positioned in the recess of the pivot frame and being pivotally engaged with the pivot frame, and with the second end being positioned in the recess of the pivot component and being pivotally engaged with the pivot component.

In yet a further aspect, bores are formed through the first end and the second ends of the hinge member.

In an additional aspect, bores extends into the pivot frame and the pivot component respectively from the recess in the pivot frame and the recess in the pivot component.

According to another aspect, a first pivot pin extends through the bore of the first end of the hinge member and into the bore defined in the pivot frame, and a second pivot pin extends through the bore of the second end of the hinge member and into the bore defined in the pivot component, thereby pivotally connecting the pivot frame to the pivot component.

In still a further aspect, the hinge member has a U-shaped cross section and has its first end defined by a first leg of the U-shapes cross section and has its second end defined by a second leg of the U-shaped cross section, the first and second legs being connected by a bight of the U-shaped cross section.

In an additional aspect, a seal is provide and engaged with pivot frame and the pivot component so as to extend over the hinge member.

In yet an another aspect, the pivot side of the second component is a first pivot side, and the pivot component further includes a second pivot side opposite of the first pivot side and extending between the top and bottom sides, at least one recess defined in the second pivot side of the pivot component.

According to a further aspect, the pivot frame is a first pivot frame and the hinge assembly further comprising a second pivot frame, the second pivot frame having a top side, a bottom side, an engagement side and a pivot side opposite of the engagement side. The engagement side of the second pivot frame being configured to engage with one end of another panel of the tonneau cover, and at least one recess is defined in the pivot side of the second pivot frame.

According to an additional aspect, the hinge member is a first hinge member and the hinge assembly further includes a second hinge member having a first end and a second end, the first end of the second hinge member being positioned in the recess of the second pivot frame and being pivotally engaged with the second pivot frame. The second end of the second hinge member is positioned in the at least one recess defined in the second pivot side of the pivot component and is pivotally engaged with the pivot component.

In still another additional aspect, the pivot frame is a first pivot frame and the pivot component is a second pivot frame configured to engage with one end of another panel of the tonneau cover.

In another aspect of the invention, a foldable tonneau cover is provided having a plurality of panels, including at least a first panel, a second panel and a third panel; a first hinge assembly pivotally connecting the first panel to the second panel, the first hinge assembly including a first pivot frame having a top side, a bottom side, an engagement side and a pivot side opposite of the engagement side, the engagement side of the first pivot frame being engaged with one end of the first panel, at least one first recess defined in the pivot side of the first pivot frame, a second pivot frame having a top side, a bottom side, an engagement side and a pivot side opposite of the engagement side, the engagement side of the second pivot frame being engaged with one end of the second panel, at least one second recess defined in the pivot side of the second pivot frame, and at least one hinge member having a first end and a second end, the first end being positioned in the first recess and pivotally engaged with the first pivot frame, the second end being positioned in the second recess and pivotally engaged with the second pivot frame; a second hinge assembly pivotally connecting the second panel to the third panel, the second hinge assembly including a third pivot frame having a top side, a bottom side, an engagement side and a pivot side opposite of the engagement side, the engagement side of the third pivot frame being engaged with an opposite end of the second panel, at least one third recess being defined in the pivot side of the third pivot frame; a pivot component having a top side, a bottom side and a pivot side extending between the top and bottom sides, at least one fourth recess defined in the pivot side of the second component; and a second hinge member having a first end and a second end, the first end being positioned in the at least one third recess of the third pivot frame and being pivotally engaged with the third pivot frame, the second end of the second hinge member being positioned in the at least one fourth recess of the pivot component and being pivotally engaged with the pivot component.

In a further aspect, the pivot side of the second component is a first pivot side, and the pivot component further includes a second pivot side opposite of the first pivot side and extending between the top and bottom sides. At least one fifth recess defined in the second pivot side of the pivot component.

In yet an additional aspect, a fourth pivot frame is provided having a top side, a bottom side, an engagement side and a pivot side opposite of the engagement side, the engagement side of the fourth pivot frame being configured to engage with one end of the third panel. At least one fifth recess is defined in the pivot side of the fourth pivot frame.

In still a further aspect, a third hinge member is provided having a first end and a second end, the first end of the third hinge member being positioned in the at least one fifth recess of the fourth pivot frame and being pivotally engaged with the fourth pivot frame, and the second end of the third hinge member being positioned in the at least one fourth recess defined in the second pivot side of the pivot component and being pivotally engaged with the pivot component.

Further aspects, features, and advantages of the present invention will become readily apparent to persons skilled in the art after a review of the following description, including the claims, and with reference to the drawings that are appended to and form a part of this specification.

BRIEF DESCRIPTION OF THE DRAWINGS

FIG. 2A is a cross sectional view, generally taken along line 2A-2A, of the tonneau cover seen in FIG. 1.

FIG. 2B is an enlarged view, with portions broken away, of the tonneau cover seen in FIG. 2A.

FIG. 4 is a perspective view of the hinge member and pin of the tonneau cover.

FIG. 5A is a perspective view of the pivot frame of the tonneau cover.

FIG. 5B is a cross sectional view, generally taken along line 5B-5B, of the pivot frame seen in FIG. 5A.

FIG. 6A is a perspective view of the spacer bar of the tonneau cover.

FIG. 6B is a cross sectional view, generally taken along line 6B-6B of the spacer bar seen in FIG. 6A.

FIG. 7A is a perspective view of an alternative spacer bar for the tonneau cover.

FIG. 7B is a cross sectional view, generally taken along line 7B-7B, of the spacer bar seen in FIG. 7A.

FIG. 8A is a cross sectional view of one of the hinge assemblies of the tonneau cover in an unfolded position.

FIG. 8B is a cross sectional view of the hinge assembly of FIG. 8A in a folded position.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part, whether or not such an axis is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
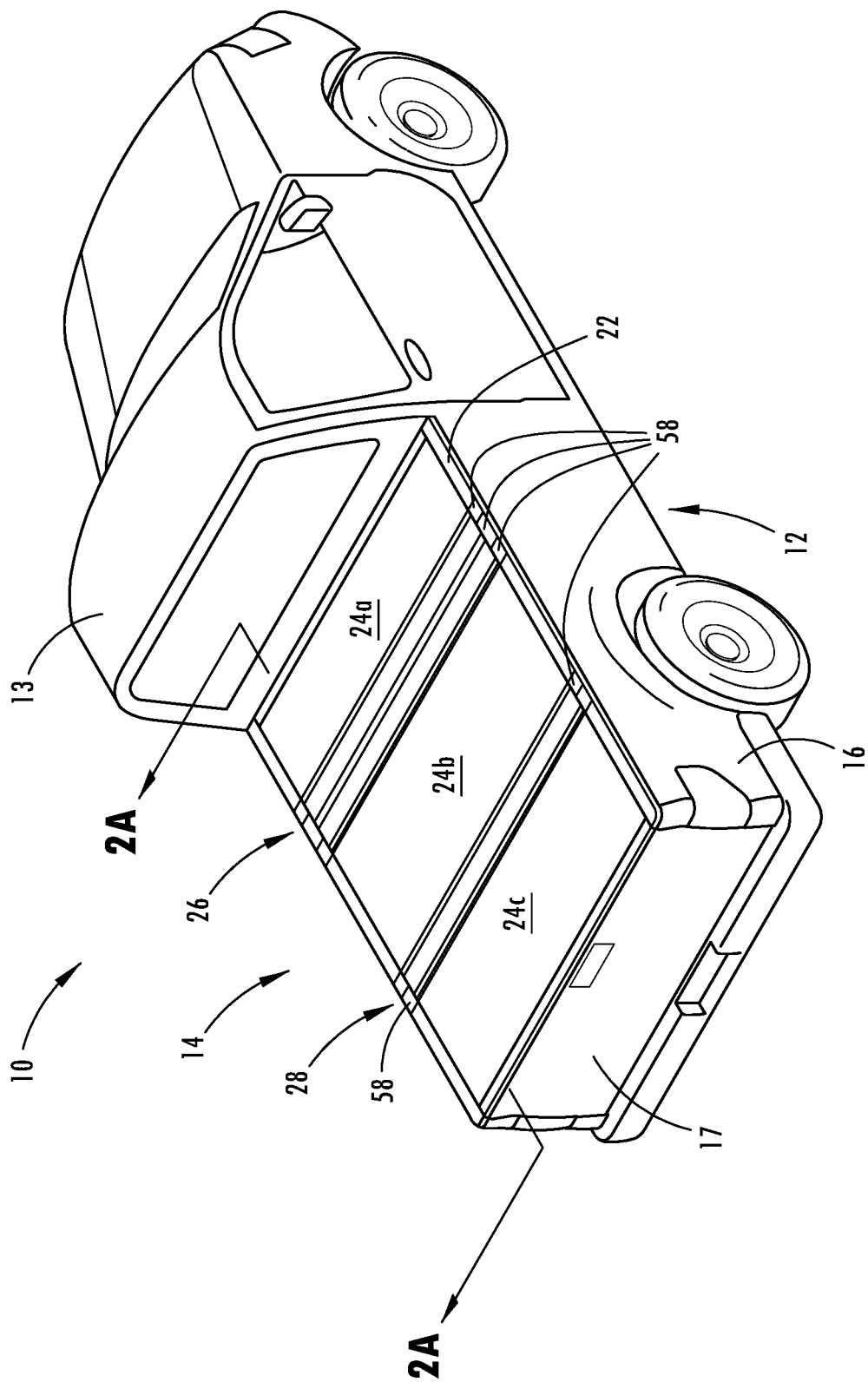
FIG. 1 is a perspective view illustrating a tonneau cover embodying the principles of the present invention mounted on a pickup truck and in an unfolded configuration.

Referring now to the drawings, a pickup truck with a foldable tonneau cover embodying the principles of the present invention is generally illustrated in FIG. 1 and designated as 10. The pickup truck 10 generally includes a cargo box 12 having sidewalls 16 connected at a rear end by a tailgate 17 and at a front end by a bulkhead (not shown). The tonneau cover 14 is shown positioned over the cargo box 12 and resting on the sidewall 16, tailgate 17 and bulkhead, but in some configurations it may reside immediately inward of these components, on additional rails mounted to the cargo box 12. The tonneau cover 14 is retained on the cargo box 12 using well known styles of clamp assemblies (not shown), typically provided in the vicinity of the four corners of the tonneau cover 14.

Figure 3:
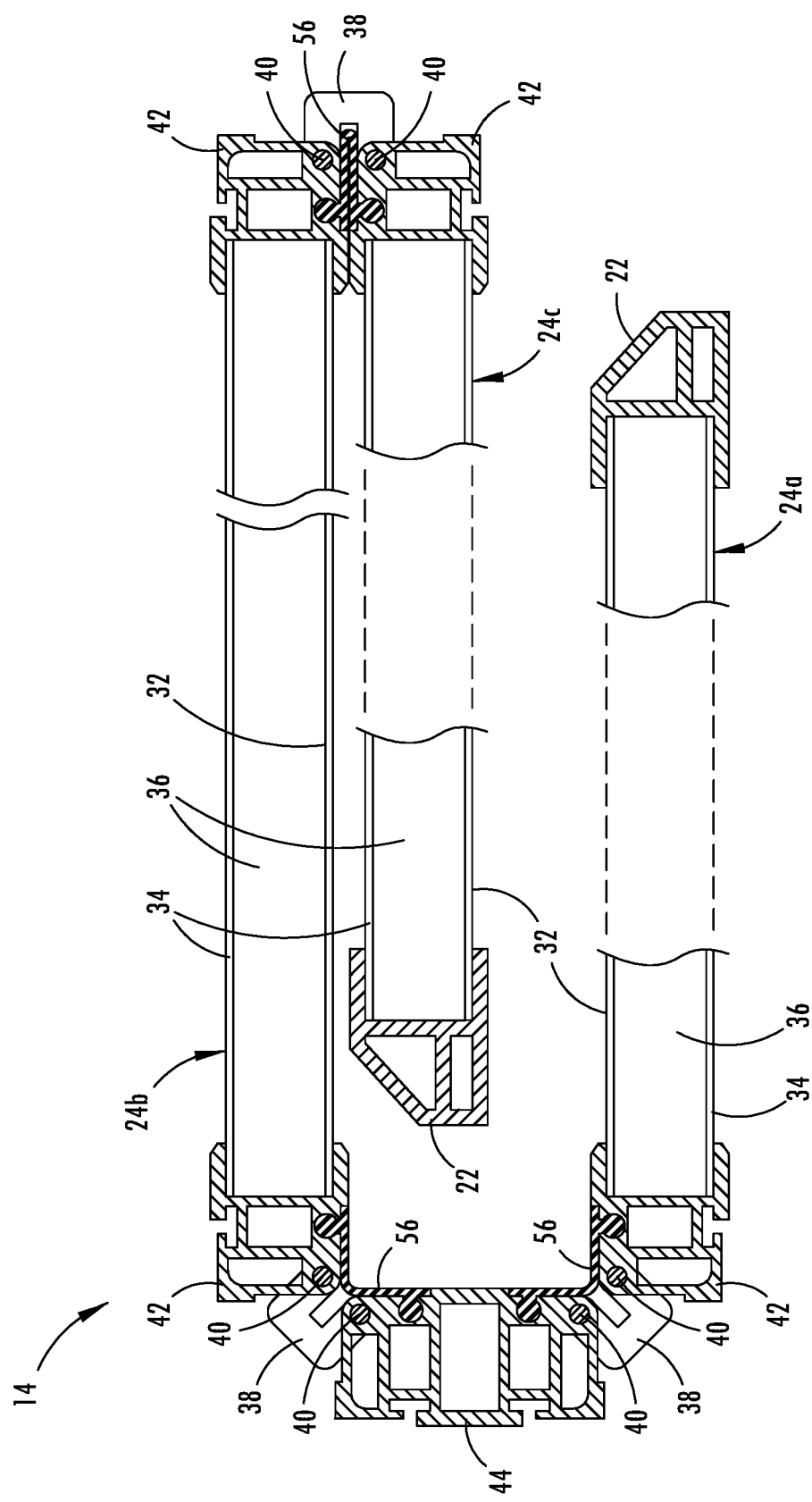
FIG. 3 shows the tonneau cover of FIG. 2A in a folded configuration.

As seen in FIGS. 1-3, the tonneau cover 14 includes a frame 22, panels 24 (specifically a front panel 24a, a middle panel 24b, and a rear panel 24c), a front hinge assembly 26, and rear hinge assembly 28. Panels 24a-24c each extend laterally across the cargo box 12 and are pivotally connected by the front hinge assembly 26 and the rear hinge assembly 28. The front and rear hinge assemblies 26, 28, also extend laterally across the cargo box 12 and are generally sized to connect panels 24a-24c. The frame members 22 are also provided about the perimeter of the panels 24a-24c on sides not adjacent to another panel 24 and hinge assemblies 26, 28. The frame members 22 are preferably made of a relatively rigid material such as extruded aluminum.

Being provided with the panels 24 and hinge assemblies 26, 28, the tonneau cover 14 is moveable between an extended position covering the cargo box 12 and a folded position allowing access into the cargo box. When the tonneau cover 14 is in the extended position, as shown in FIG. 1, the frame members 22 rest on top of the sidewalls 16, as well the tailgate 17 and bulkhead, of the cargo box 12. In this position, the tonneau cover 14 covers the interior space of the cargo box 12, preventing rain, snow, dirt and other debris from entering the cargo box 12 and preventing a passerby seeing the contents of the cargo box 12.

The front and middle panels 24a and 24b are pivotally connected to one another by the front hinge assembly 26, and the middle and rear panels 24b and 24c are pivotally connected to one another by the rear hinge assembly 28.

During folding of the tonneau cover 14, the process is initiated from the rear of the truck 10, adjacent to the tailgate 17, and proceeds toward the passenger cabin 13. During this process, the rear panel 24c is folded about the rear hinge assembly 28, up, over on top of the middle panel 24b. Then, both the middle and rear panels 24b, 24c are folded about the front hinge assembly 26, up, over and on top of the third panel 24c, achieving the configuration of the tonneau cover 14 seen in FIG. 3. One or more standoffs (not shown) may be provided on the lower surface of the rear panel 24c so that all of the panels 24 lie generally parallel to one another.

While the tonneau cover 14 is generally shown and described herein as having three panels 24a-24c and two hinge assemblies 26, 28, the tonneau cover 14 may be formed of any combination of panels and hinge assemblies. For example, the tonneau cover system 14 may include just two panels and one hinge assembly or it may include four or more panels and three or more hinge assemblies.

Referring now to the cross sectional view seen in FIGS. 2A-3, each of the panels 24 include a top sheet 32, a bottom sheet 34, and a core 36 sandwiched between the top and bottom sheets 32, 34. The top and bottom sheets 32, 34 can be made of a relatively rigid, material such as aluminum, or a semi-rigid material such as polypropylene sheets. The core 36 may be made of a lightweight material that provides rigidity and strength, such as closed cell polystyrene foam or polypropylene foam or a honeycomb structure.

With reference to FIGS. 4-6B and 8A-9B, the front and rear hinge assemblies 26, 28 have as their principal components a hinge members 38, pivot pins 40, and pivot frames 42. In the case of the front hinge assembly 26, a spacer bar 44 is also included to extend the overall width of the front hinge assembly 26. In some implementations, a waterproof seal 56 may be incorporated along the length of the hinge assemblies 26, 28 to prevent water from entering the cargo box 12 through the hinge assemblies 26, 28. While not shown in detail, the ends of the pivot frames 42 and spacer bar 44 are further covered by end caps 58 (see FIG. 1) mounted thereto.

The hinge member 38 as shown in FIG. 4, the hinge member 38 is a U-shaped structure having spaced apart, generally parallel legs 74, forming a channel 62, which are joined at one end by a bight or bridge 175. Each leg 74 of the hinge member 38 further includes a bore 46 formed at one end and extending through the length of the hinge member 38. The bore 46 is sized to receive the pivot pin 40. As such, the outer diameter of the pivot pin 40 is preferably slightly less than the inner diameter of the bore 46 and may permit relative rotation there between.

The hinge member 38 is preferably made of extruded aluminum or other metal. In some implementations, the hinge member 38 may be molded from polypropylene or reinforced nylon to provide sufficient strength and structural integrity to the hinge assemblies 26, 28.

The pivot pins 40 are preferably also made of metal to ensure durability and ease of rotation in the hinge assemblies 26, 28. Preferably, the pivot pins 40 are made of the same metal used in the rest of the hinge assembly 26, 28 to minimize corrosion. Accordingly, the pivot pins 40 are preferably made of extruded or machined aluminum.

The pivot frame 42 is preferably an extruded elongated body formed, preferably, of extruded aluminum. One lateral side of the pivot frame 42 is formed with an engagement feature 54 that receives an edge of one of the panels 24. The engagement feature 54 therefore mirrors the profile of the edge of the panel 24 and includes opposed upper and lower lips 55 defining a channel 57 there between and into which the edge of the panel 24 is received.

The pivot frame 42, as seen in FIG. 5A, is formed with two hollow chambers 50 that extend the length of the pivot frame 42. The chambers 50 lighten the pivot frame 42 and at least one of which also operates to receive a correspondingly shaped projections of the end caps 58 to retain the end caps 58 to the pivot frame 42 in a press fit, frictional or other engagement. The end caps 58 define the corners of the panels 24 and the similarly engage with the frame members 22, also preferably of extruded aluminum, provided along the lateral sides of the panels 24. While chambers 50 are shown and described herein as being generally rectangular, the hollow sections 50 may define other shapes (e.g., round or triangular) within the scope of the present disclosure.

On a side of the pivot frame 42, opposite from the engagement feature 54 and channel 57, the pivot frame 42 is provided with two cut outs or recesses 48. The recesses 48 are provided at spaced apart locations along the length of the pivot frame 42 and are generally sized to accommodate and receive one half of a hinge member 38. While illustrated with two recesses 48, it will be appreciated that more than two, or a single longer length recess, may alternatively be provided. The height of the legs 74 of the hinge member 38 is therefore approximate to the height of the pivot frame 42 and the depth of the recess 48 into the pivot frame 42 is approximate to one-half of the width of the U-shape cross section of the hinge member 38. The length of the recess 48 along the pivot frame 42 is therefore approximate to and slightly longer than the length of the hinge member 38. With these dimensions, the hinge member 38 does not protrude from the pivot frame 42, or the tonneau cover 14, downward into the cargo box 12 when the tonneau cover 14 is in its extended position.

A pivot bore 60 is formed through the length of each of the pivot frames 42, as seen in FIG. 5A. The pivot bore 60 is located so as to be aligned with the bores 46 in the legs 74 of the hinge member 38, when the hinge members 38 are positioned within the recesses 48 of the pivot frames 42. The bores 60 are sized to receive the pivot pins 40 and allow the pivot pins 40 to be inserted into the bores 46 of the hinge members 38. The pivot pins 46 have a length greater than the length of the hinge members 38 and are inserted through the bores 60 so that the pivot pins 40 engage and extend from both ends of the hinge members 38 into the bores 60. The pivot pins 40 therefore pivotally join the hinge members 38 to the pivot frames 42 by extending through both bores 60 and 46.

As previously mentioned, the pivot frame 42 is preferably formed of extruded aluminum with the recesses 48 machined therein. In other implementations, the pivot frame 42 may be fabricated other metal or materials.

Still referring to FIGS. 5A and 5B, provided in a top surface of the pivot frame 42 and extending along the length of the pivot frame 42 is a retainer slot 52. The retainer slot 52 is sized to receive a correspondingly shaped retainer fitting 72, which is formed on one end of a lower surface of a seal 56. As shown, the retainer slot 52 is round in cross section with a narrow opening up through the top surface of the pivot frame 42. The retainer fitting 72 is similarly round extension off of the seal 56. While are generally shown and described herein as being rounded, the retainer slot 52 may have other configurations (e.g., T-shape). The seal 56 includes retainer fittings 72 along its sides and is preferably made of a flexible material, such as rubber, that can be injection molded. For example, the waterproof strip may be made of silicone. In another example, the waterproof strip may be made of a thermoplastic elastomer.

As seen in FIGS. 8A and 8B the rear hinge assembly 28 is generally made up of two pivot frames 42, in mirrored symmetry, interconnected by two hinge members 38 and their associated pivot pins 40. More specifically, one pivot frame 42 is mounted via its engagement feature 54 to the forward end of the of the rear panel 24c, another pivot frame 42 is mounted via its engagement feature 54 to the rearward end of the middle panel 24b. One leg 74 of a pivot member 38 is located in the opposed recesses 48 of each of the pivot frames 42 and pivotally couples the two pivot frames 42 together by the pivot pins 40, which extend through and out from both sides the bores 46 of the hinge members 38 into the bores 60 of the pivot frames 42.

With the pivot frames 42 joined by the hinge member 38, the seal 56 is attached to each of the pivot frames 42 by sliding the seal 56 into position from the ends of the pivot members 42. Once the fittings 72 on each side of the seal 56 are engaged in the retainer slots 52, the body 73 of the seal 56, which is generally thin planar sheet, is positioned over the juncture between the two pivot frames 42, including extending over the hinge member 38 and recesses 48, thereby forming a seal extending the full length of the pivot frames 42 and the width of the tonneau cover 14. The ends 75 of the body 73 of the seal 56 may be received in recessed steps 77 defined in the pivot frames 42 adjacent to the retaining slots 52. The depth of the steps 77 may also correspond with the thickness of the body 73 so that the seal 54 is flush with the top surface of the upper flange 55 of engagement feature 54.

Through incorporation of the hinge members 38 the recesses 48 of the opposed pivot frames 42, the rear panel 24c is permitted to pivot, about arrow 79 in FIG. 8A, up, over and on top of the middle panel 24b, into the position seen in FIG. 8B. During this movement, the rear panel 24c pivots relative to the hinge member 38 about the pivot pin 40 extending through its bore 60 and the middle panel 24b pivots relative to the hinge member 38 about the pivot pin 40 extending through its bore 60. During this movement, the central portion of the seal 56, the portion between the fittings 72, can recede into the channel 62 of the hinge member 38, allowing the pivot frames 42 of the rear hinge assembly 28 to lie directly on top of one another.

Figure 9A:
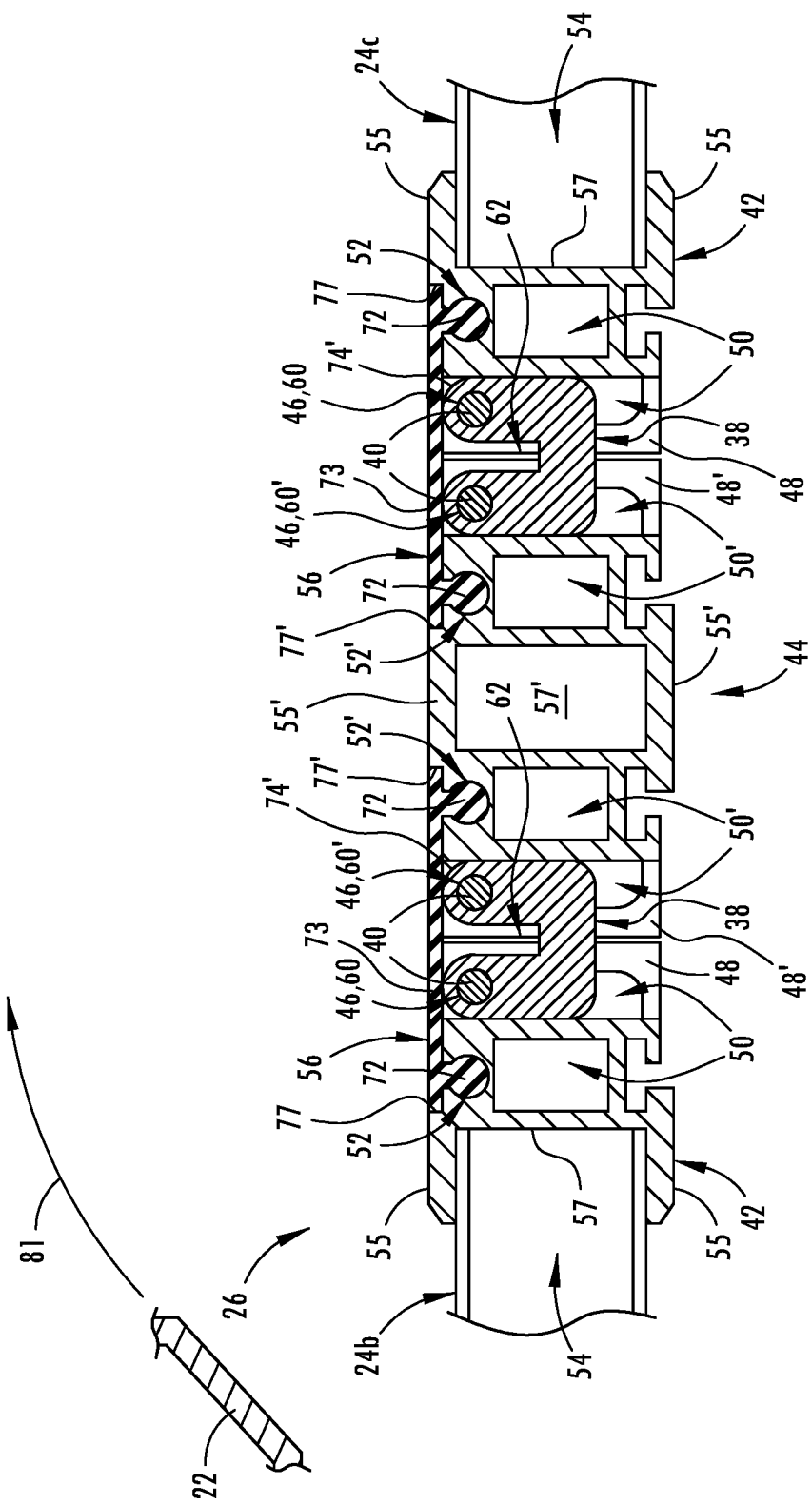
FIG. 9A is a cross sectional view of the other of the hinge assemblies of the tonneau cover in an unfolded position.

Referring now to FIG. 9A, the front hinge assembly 26 is illustrated therein. The front hinge assembly 26 is similar to the rear hinge assembly 28 in that it includes pivot frames 42 connected to the front and rear ends of panels 24, specifically to the middle panel 24b and to the front panel 24a, and includes hinge members 38 mounted in the recesses 48 of the pivot frames 42. However, instead of two pivot frames 42 being directly joined to one another by the hinge members 38, the hinge members 38 are connected to a spacer bar 44 interposed between the pivot frames 42. FIG. 6A illustrates the spacer bar 44 apart from the front hinge assembly 26 and FIG. 6B illustrates a cross section of the spacer bar 44.

As appreciated from FIGS. 6A and 6B, the spacer bar 44 construction mirrors that of the pivot frames 42 and can be viewed as having a construction where two pivot frames 42 are integrated by joining together the upper and lower lips 55. This commonality of construction is further apparent from a comparison of the right half of the spacer bar 44 seen in FIG. 6B with the pivot frame 42 seen in FIG. 5B. Accordingly, in FIGS. 6A, 6B, 9A and 9B, features of the spacer bar 44 corresponding to those of the pivot frame 42 are designated with like reference numerals bearing a prime (') designation. The hinge members 38 and seals 56 used in conjunction with the spacer bar 44 are the same as previously discussed in connection with the rear hinge assembly 28.

As such, the spacer bar 44 is preferably an extruded elongated body formed, preferably, of extruded aluminum. The central portion of the spacer bar 44 is formed with upper and lower webs 55' that cooperatively define a cavity 57'. The webs 55' generally correspond with the lips 55 of the pivot frame 42, while the cavity 57' generally corresponds with the channel 57 between the lips 55.

Laterally to each side of the central portion, the spacer bar 44 is formed with two hollow chambers 50' that extend the length of the spacer bar 44, which lighten the weight of the spacer bar 44. The chambers 50', along with cavity 57', each may also operates to receive a correspondingly shaped projection of an end cap 58 and to retain an end cap 58' in a press fit, frictional or other engagement with each end of the spacer bar 44. Unlike the end caps 58 of the pivot frames 42, the end caps 58' of the spacer bar 44 only engage with the spacer bar 44. While chambers 50' are shown and described herein as being generally rectangular, it will be appreciated that other shapes (e.g., round or triangular) are within the scope of the present disclosure.

On each of the lateral sides of the spacer bar 44, two cut outs or recesses 48' are provided at spaced apart locations along the length thereof. While two recesses 48' are illustrated, it will again be appreciated that more than two, or a single longer length recess, may alternatively be provided in the spacer bar 44. The recesses 48' are sized to accommodate and receive one half of a hinge member 38 therein, as previously described in connection with the pivot frames 42.

Also on each lateral side, pivot bores 60' are formed lengthwise through the spacer bar 44, as seen in FIG. 6A. The pivot bores 60 are located so as to be aligned with the recesses 48' and with the bores 46 in the legs 74 of the hinge members 38, when the hinge members 38 are positioned within the recesses 48' of the pivot frames 42. Like bores 60, the bores 60' are sized to receive the pivot pins 40 and allow them to be inserted into the bores 46 of the hinge members 38. The pivot pins 40 therefore pivotally join the hinge members 38 to the spacer bar 44 by extending through both bores 60' and 46.

With the pivot frames 42 joined by the hinge members 38 to the spacer bar 44, two seals 56 are attached to the front hinge assembly 26 by sliding the seals 56 into position from the ends of the pivot members 42 and spacer bar 44. Once the fittings 72 along the sides of the seals 56 are engaged in the retainer slots 52, 52', the body 73 of the seals 56 are positioned over the juncture between the pivot frames 42 and the spacer bar 44, including extending over the hinge member 38 and recesses 48, thereby forming a seal extending the full length of the pivot frames 42 and the width of the tonneau cover 14. The medial ends 75 of the body 73 of the seal 56 may be received in recessed steps 77' defined in the central portion of the spacer bar 44 so that the seal 54 is flush with the top surface of the web 55' of the spacer bar 44.

Figure 9B:
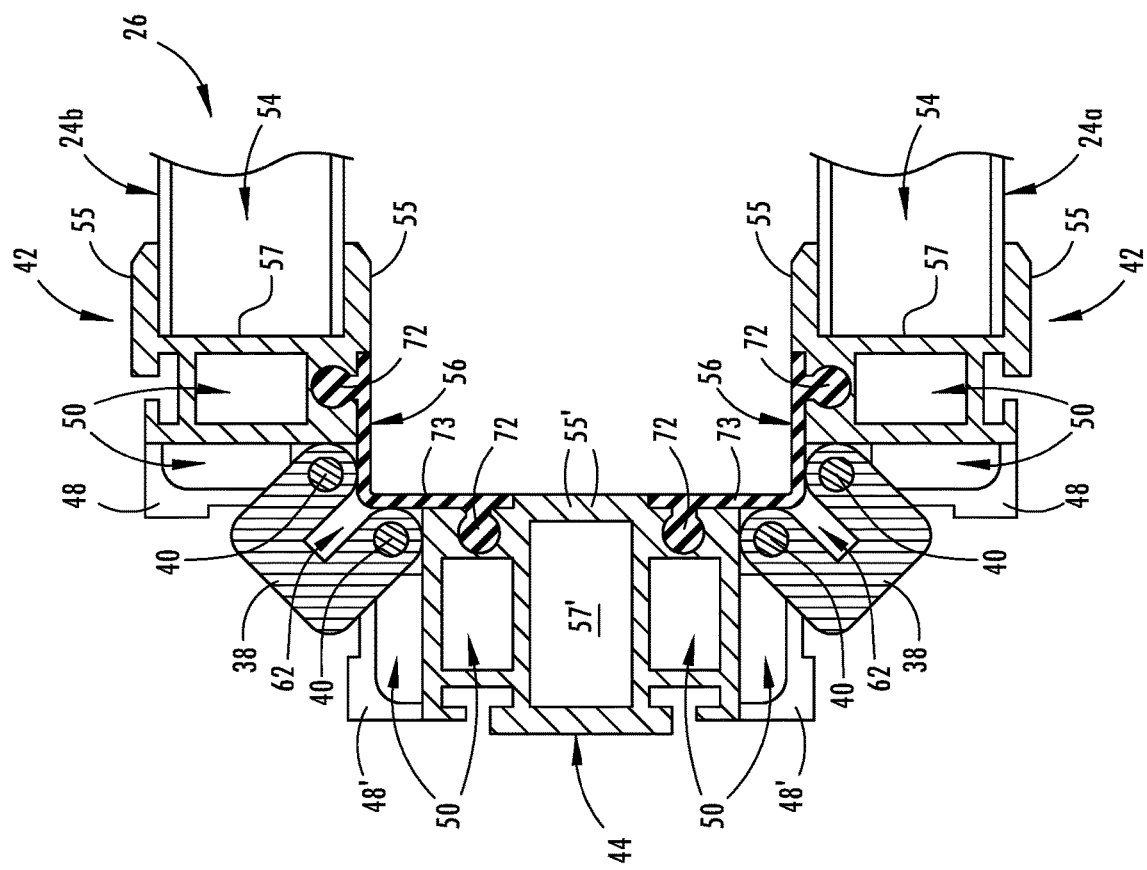
FIG. 9B is a cross sectional view of the hinge assembly of FIG. 9A in a folded position.

Through incorporation of the spacer bar 44 between the pivot frames 42, the rear panel 24c and middle panel 24b are together permitted to be folded, generally about arrow 79 in FIG. 9A, up, over and on top of the middle panel 24b, into the position seen in FIG. 9B. (Rear panel 24c is omitted from FIG. 9B for better clarity in showing the front hinge assembly 26.) During this folding movement, four pivots axes are defined. The middle panel 24b pivots relative to the hinge member 38 about the pivot pin 40 extending through its bore 60 into the pivot frame 42 mounted to the forward end of the middle panel 24b. The spacer bar 44 pivots relative to that same hinge member 38 about the pivot pin 40 extending through its rearwardly located bore 60'. The spacer bar 44 also pivots relative to the other hinge member 38 about the pivot pin 40 extending through the spacer bar's forwardly located bore 60'. Finally, the latter hinge member 38 pivots relative to the front panel 24a about the pivot pin 40 extending through its bore 60 into the pivot frame 42 mounted to the front panel 24a. During this folding and pivoting movement, the central portions 73 of the seals 56, the portion between the fittings 72, can partially recede into the channels 62 of the hinge members 38, allowing the panels 24 to lie generally parallel with one another.

In an alternative construction, hinge members 138, including bores 146 in the legs 174 thereof, are unitarily formed as part of a spacer bar 144 in the location previously occupied by the recesses 48'. Such a construction is seen in FIGS. 7A and 7B. The remaining construction of the spacer bar 144 is the same as seen and discussed in connection with FIGS. 6A and 6B. Like features are therefore designated with like reference numerals and reference to the prior discussion should be made for a detailed explanation thereof. While two hinge members 138 are illustrated, it will be appreciated that more than two, or a single longer length hinge member, may alternatively be provided in the spacer bar 144.

With the unitary construction of FIGS. 7A and 7B, two, as opposed to four, pivots axes are defined when folding the tonneau cover 14. In this implementation, the pivot frames 42 pivot about pins 40 inserted through bores 146 in the legs 174 of the pivot members 138, which are received in the recesses 48 pivot frames 42 mounted to the forward and rearward ends of the middle and front panels 24b and 24a, respectively.

The above description is meant to be illustrative of at least one preferred implementation incorporating the principles of the invention. A person skilled in the art will really appreciate that the invention is susceptible to modification, variation and change without departing from the true spirit and fair scope of the invention, as defined in the claims that follow. The terminology used herein is therefore intended to be understood in the nature of words of description and not words of limitation.

We claim:
1. A foldable tonneau cover comprising:
a plurality of panels including at least a first panel and a second panel; and
a hinge assembly pivotally connecting the first panel to the second panel and including:
a first pivot frame having a top side, a bottom side, an engagement side and a pivot side opposite of the engagement side, the engagement side of the first pivot frame being engaged with one end of the first panel, at least one first recess defined in the pivot side of the first pivot frame;
a second pivot frame having a top side, a bottom side, an engagement side and a pivot side opposite of the engagement side, the engagement side of the second pivot frame being engaged with one end of the second panel, at least one second recess defined in the pivot side of the second pivot frame;
a hinge member having a first end and a second end, the first end being positioned in the first recess and pivotally engaged with the first pivot frame, the second end being positioned in the second recess and pivotally engaged with the second pivot frame; a first pivot pin extending through the first end of the hinge member and into the first pivot frame, and a second pivot pin extending through the second end of the hinge member and into the second pivot frame, thereby pivotally connecting the first pivot frame to the second pivot frame.

2. The foldable tonneau cover according to claim 1, further comprising bores formed through the first and the second ends of the hinge member.

3. The foldable tonneau cover according to claim 2, further comprising bores extending into the first and second pivot frames from the recesses, the first and second pivot pins extending through the bores in the first and second end and into the bores extending into the first and second pivot frames.

4. The foldable tonneau cover according to claim 1, further comprising a seal, the seal being engaged with first and second pivot frames and extending over the hinge member.

5. A foldable tonneau cover comprising:
a plurality of panels including at least a first panel and a second panel; and
a hinge assembly pivotally connecting the first panel to the second panel and including:
a first pivot frame having a top side, a bottom side, an engagement side and a pivot side opposite of the engagement side, the engagement side of the first pivot frame being engaged with one end of the first panel, at least one first recess defined in the pivot side of the first pivot frame;
a second pivot frame having a top side, a bottom side, an engagement side and a pivot side opposite of the engagement side, the engagement side of the second pivot frame being engaged with one end of the second panel, at least one second recess defined in the pivot side of the second pivot frame; and
a hinge member having a first end and a second end, the first end being positioned in the first recess and pivotally engaged with the first pivot frame, the second end being positioned in the second recess and pivotally engaged with the second pivot frame, the hinge member having a U-shaped cross section, the first end being defined by a first leg of the U-shape cross section and the second end being defined by a second leg of the U-shaped cross section, the first and second legs being connected by a bight of the U-shaped cross section.

6. The foldable tonneau cover according to claim 1, further comprising a seal, the seal engaged with first and second pivot frames and extending over the hinge member.

7. A hinge assembly for a tonneau cover, the hinge assembly allowing panels of the tonneau cover to be folded on top of one another, the hinge assembly comprising:
 a pivot frame having a top side, a bottom side, an engagement side and a pivot side opposite of the engagement side, the engagement side of the pivot frame being configured to engage with one end of a panel of the tonneau cover, at least one recess defined in the pivot side of the pivot frame;
 a pivot component having a top side, a bottom side and a pivot side extending between the top and bottom sides, at least one recess defined in the pivot side of the second component; and
 a hinge member having a first end and a second end, the first end being positioned in the recess of the pivot frame and being pivotally engaged with the pivot frame, the second end being positioned in the recess of the pivot component and being pivotally engaged with the pivot component.

8. The hinge assembly according to claim 7, further comprising bores formed through the first end and the second ends of the hinge member.

9. The hinge assembly according to claim 8, further comprising bores extending into the pivot frame and the pivot component respectively from the recess in the pivot frame and the recess in the pivot component.

10. The hinge assembly according to claim 9, further comprising a first pivot pin extending through the bore of the first end of the hinge member and into the bore defined in the pivot frame, and a second pivot pin extending through the bore of the second end of the hinge member and into the bore defined in the pivot component, thereby pivotally connecting the pivot frame to the pivot component.

11. The hinge assembly according to claim 7, wherein the hinge member has a U-shaped cross section and has the first end defined by a first leg of the U-shapes cross section and has the second end defined by a second leg of the U-shaped cross section, the first and second legs being connected by a bight of the U-shaped cross section.

12. The hinge assembly according to claim 7, further comprising a seal, the seal engaged with pivot frame and the pivot component and extending over the hinge member.

13. The hinge assembly according to claim 7, wherein the pivot frame is a first pivot frame and the pivot component is a second pivot frame configured to engage with one end of another panel of the tonneau cover.

14. The hinge assembly according to claim 7, wherein the hinge member includes only two pivotable engagements.

15. The hinge assembly according to claim 7, wherein the pivotal engagement of the first end with the pivot frame and the second end with the pivot component are fixed in location relative thereto.

16. A foldable tonneau cover comprising:
 a plurality of panels including at least a first panel, a second panel and a third panel; and
 a first hinge assembly pivotally connecting the first panel to the second panel, the first hinge assembly including a first pivot frame having a top side, a bottom side, an engagement side and a pivot side opposite of the engagement side, the engagement side of the first pivot frame being engaged with one end of the first panel, at least one first recess defined in the pivot side of the first pivot frame,
  a second pivot frame having a top side, a bottom side, an engagement side and a pivot side opposite of the engagement side, the engagement side of the second pivot frame being engaged with one end of the second panel, at least one second recess defined in the pivot side of the second pivot frame, and
  at least one hinge member having a first end and a second end, the first end being positioned in the first recess and pivotally engaged with the first pivot frame, the second end being positioned in the second recess and pivotally engaged with the second pivot frame;
 a second hinge assembly pivotally connecting the second panel to the third panel, the second hinge assembly including
  a third pivot frame having a top side, a bottom side, an engagement side and a pivot side opposite of the engagement side, the engagement side of the third pivot frame being engaged with an opposite end of the second panel, at least one third recess being defined in the pivot side of the third pivot frame;
  a pivot component having a top side, a bottom side and a pivot side extending between the top and bottom sides, at least one fourth recess defined in the pivot side of the second component; and
  a second hinge member having a first end and a second end, the first end being positioned in the at least one third recess of the third pivot frame and being pivotally engaged with the third pivot frame, the second end of the second hinge member being positioned in the at least one fourth recess of the pivot component and being pivotally engaged with the pivot component.

17. The foldable tonneau cover according to claim 16, wherein the pivot side of the second component is a first pivot side, the pivot component further including a second pivot side opposite of the first pivot side and extending between the top and bottom sides, at least one fifth recess defined in the second pivot side of the pivot component.

18. The foldable tonneau cover according to claim 17, further comprising a fourth pivot frame, the fourth pivot frame having a top side, a bottom side, an engagement side and a pivot side opposite of the engagement side, the engagement side of the fourth pivot frame being configured to engage with one end of the third panel, at least one fifth recess defined in the pivot side of the fourth pivot frame.

19. The hinge assembly according to claim 18, further comprising a third hinge member having a first end and a second end, the first end of the third hinge member being positioned in the at least one fifth recess of the fourth pivot frame and being pivotally engaged with the fourth pivot frame, the second end of the third hinge member being positioned in the at least one fourth recess defined in the second pivot side of the pivot component and being pivotally engaged with the pivot component.

20. The foldable tonneau cover according to claim 16, wherein the first and second hinge assemblies each include only two pivotable engagements.

* * * * *